United States Patent
Hasegawa et al.

(10) Patent No.: US 9,840,194 B2
(45) Date of Patent: Dec. 12, 2017

(54) ILLUMINATION SYSTEM AND MOBILE BODY

(71) Applicant: Panasonic Intellectual Property Management Co., Ltd., Osaka (JP)

(72) Inventors: Junichi Hasegawa, Osaka (JP); Kazuhiro Hatta, Osaka (JP); Hiroki Noguchi, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/453,222

(22) Filed: Mar. 8, 2017

(65) Prior Publication Data

US 2017/0259736 A1    Sep. 14, 2017

(30) Foreign Application Priority Data

Mar. 10, 2016   (JP) .................. 2016-046378

(51) Int. Cl.
| | |
|---|---|
| *B60Q 3/47* | (2017.01) |
| *B60Q 3/76* | (2017.01) |
| *B60Q 3/44* | (2017.01) |
| *B64D 11/06* | (2006.01) |
| *B64D 11/00* | (2006.01) |

(52) U.S. Cl.
CPC .............. *B60Q 3/47* (2017.02); *B60Q 3/44* (2017.02); *B60Q 3/76* (2017.02); *B64D 11/064* (2014.12); *B64D 11/0641* (2014.12); *B64D 2011/0053* (2013.01)

(58) Field of Classification Search
CPC ... B60Q 3/47; B60Q 3/44; B60Q 3/76; B64D 11/064; B64D 11/0641; B64D 2011/0053
See application file for complete search history.

(56) References Cited

U.S. PATENT DOCUMENTS

| | | | |
|---|---|---|---|
| 2004/0213005 A1* | 10/2004 | Kohlmeier-Beckmann | F21V 7/0008 362/471 |
| 2006/0261970 A1* | 11/2006 | Colacecchi | B64D 11/00 340/686.1 |
| 2010/0065683 A1* | 3/2010 | Darbyshire | B64D 11/06 244/118.6 |

FOREIGN PATENT DOCUMENTS

| | | |
|---|---|---|
| JP | 2008-200486 A | 9/2008 |
| JP | 2009-125276 A | 6/2009 |
| JP | 2010-099410 A | 5/2010 |
| JP | 2010-145763 A | 7/2010 |
| JP | 2015-221655 A | 12/2015 |

* cited by examiner

Primary Examiner — Mary Ellen Bowman
(74) Attorney, Agent, or Firm — McDermott Will & Emery LLP

(57) ABSTRACT

An illumination system includes: a seat; a wall; and a sleep control light for controlling sleep, wherein the seat includes a backrest and a seating portion, and makes a transition between a seated state and a lying state when the backrest and the seating portion make a slide movement, the seated state being a state where a minor angle formed between the backrest and the seating portion is a first angle, the lying state being a state where the minor angle is a second angle greater than the first angle, an optical axis of the sleep control light is tilted downward with respect to the horizontal plane, the sleep control light is located behind or above the seat when the seat is in the seated state, and the optical axis of the sleep control light passes through the backrest when the seat is in the lying state.

14 Claims, 15 Drawing Sheets

ILLUMINATION SYSTEM AND MOBILE BODY

CROSS REFERENCE TO RELATED APPLICATION

This application claims the benefit of priority of Japanese Patent Application Number 2016-046378 filed on Mar. 10, 2016, the entire content of which is hereby incorporated by reference.

BACKGROUND

1. Technical Field

The present disclosure relates to an illumination system including a seat and a sleep control light, and to a mobile body including the illumination system.

2. Description of the Related Art

An illumination system in transportation includes a luminaire that assists a user in reading in a seat or a luminaire that provides brightness necessary for the user in having a meal. A technique for controlling a luminaire to support the user's sleep and awakening is known (see Japanese Unexamined Patent Application Publication No. 2010-99410, for example).

SUMMARY

There is a demand for such an illumination system to more effectively support sleep or awakening.

In view of this, it is an object of the present disclosure to provide an illumination system or a mobile body which can more effectively support sleep or awakening.

An illumination system according to an aspect of the present disclosure includes: a seat; a wall surrounding the seat at least partially; and a sleep control light for controlling sleep, wherein the seat includes a backrest and a seating portion, and makes a transition between a first state and a second state when the backrest and the seating portion make a slide movement, the first state being a state in which a minor angle formed between the backrest and the seating portion is a first angle, the second state being a state in which the minor angle formed between the backrest and the seating portion is a second angle greater than the first angle, an optical axis of the sleep control light is tilted downward with respect to a horizontal plane, the sleep control light is located either one of behind the seat and above the seat when the seat is in the first state, and the optical axis of the sleep control light passes through the backrest when the seat is in the second state.

Furthermore, a mobile body according to an aspect of the present disclosure includes the above illumination system.

The present disclosure provides an illumination system or a mobile body which can more effectively support sleep or awakening.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF EMBODIMENT

Hereinafter, an embodiment of the present disclosure will be described with reference to the drawings. It should be noted that the embodiment described below is to show a specific example of the present disclosure. Therefore, the numerical values, shapes, materials, structural elements, and the arrangement and connection of the structural elements, etc., shown in the following embodiment are mere examples, and are not intended to limit the present disclosure. As such, among the structural elements in the following embodiment, those not recited in any one of the independent claims which indicate the broadest inventive concepts will be described as arbitrary structural elements.

It should also be noted that each drawing is a schematic illustration and is not necessarily a precise illustration. Furthermore, essentially the same structural elements are given the same reference signs in the figures, and overlapping descriptions thereof will be omitted or simplified.

EMBODIMENT

[Usage Example]

Figure 1:
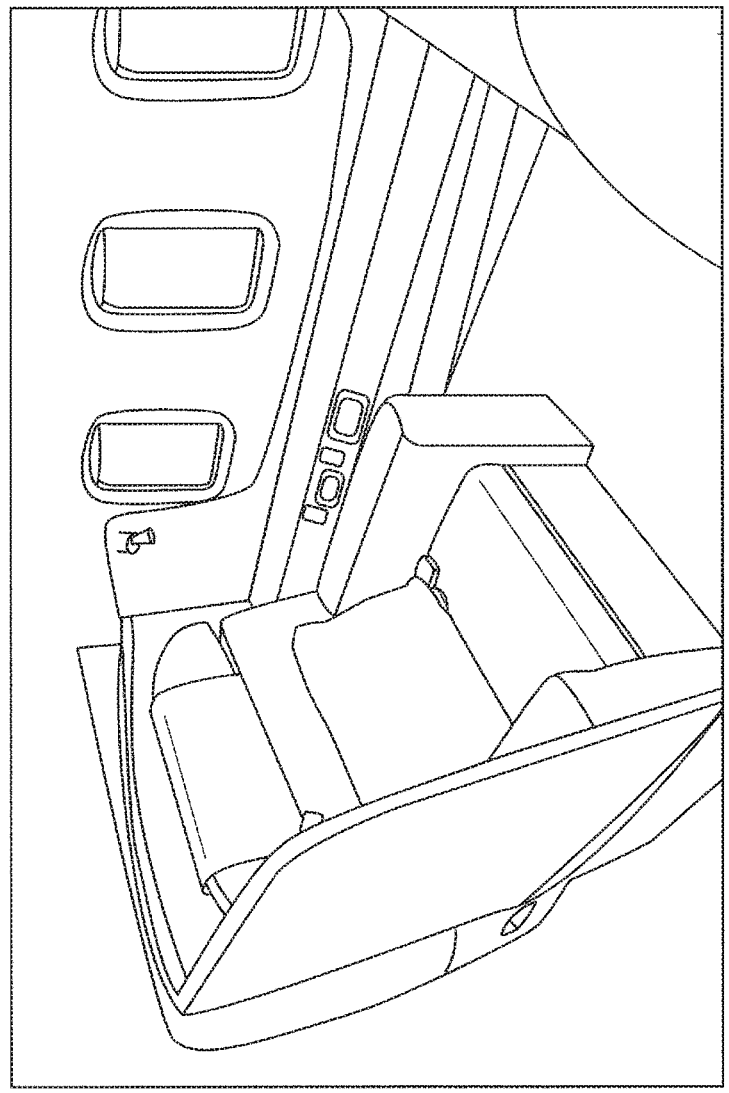
FIG. 1 illustrates an example of use of an illumination system according to an embodiment.

First, an example of use of an illumination system according to the present embodiment will be described. FIG. 1 illustrates an example of use of the illumination system according to the present embodiment. The illumination system according to the present embodiment is used for a mobile body, and is used for, for example, a seat of an airplane as illustrated in FIG. 1. It should be noted that the illumination system according to the present embodiment may be used for a seat of a mobile body other than an airplane (a train, for example), or in a place other than a mobile body.

[Configuration of Illumination System]

Figure 2:
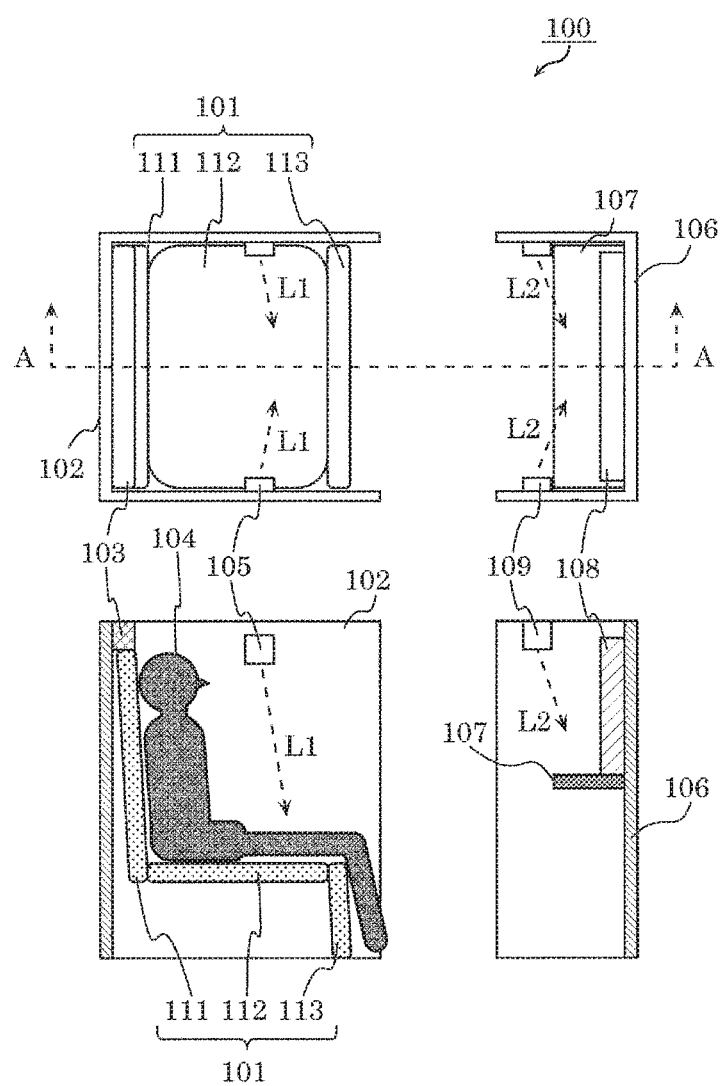
FIG. 2 is a plan view and a cross sectional view illustrating a seated state of an illumination system according to an embodiment.
Figure 3:
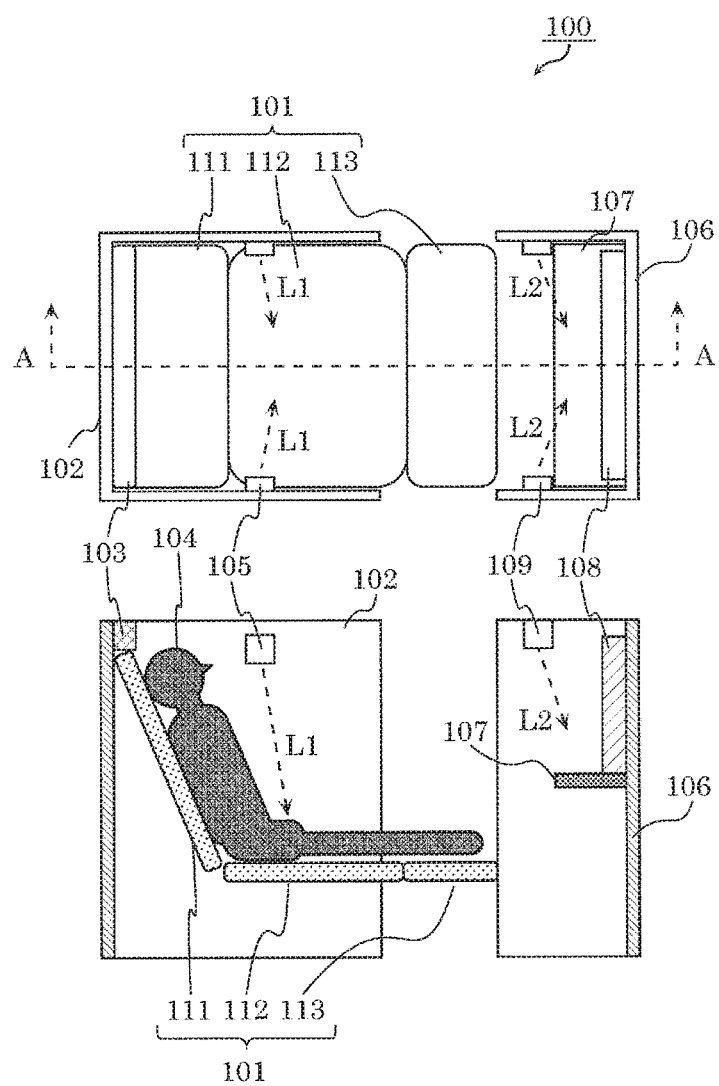
FIG. 3 is a plan view and a cross sectional view illustrating a transition from a seated state to a lying state of an illumination system according to an embodiment.
Figure 4:
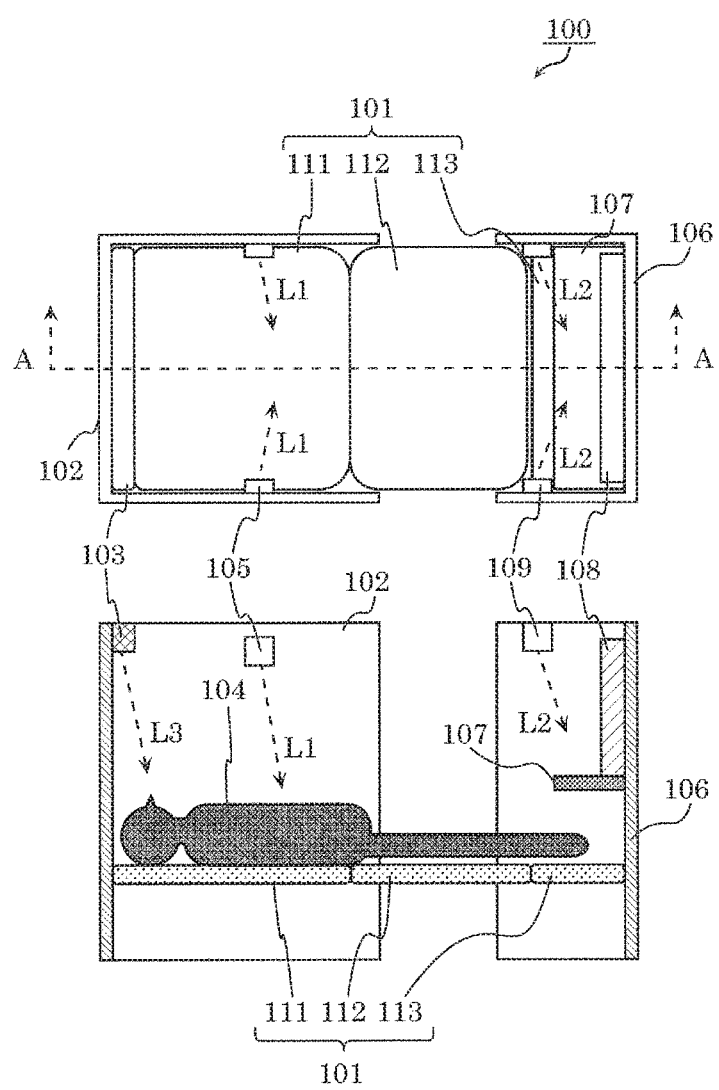
FIG. 4 is a plan view and a cross sectional view illustrating a lying state of an illumination system according to an embodiment.

Hereinafter, a configuration of an illumination system according to the present embodiment will be described. FIG. 2 to FIG. 4 illustrate a configuration of illumination system 100 according to the present embodiment. The diagram in the upper half of each figure is a plan view of illumination system 100 viewed from above, whereas the diagram in the lower half is a cross sectional view taken along A-A plane in the upper diagram.

As illustrated in FIG. 2 to FIG. 4, illumination system 100 includes seat 101, walls 102 and 106, sleep control light 103, reading light 105, table 107, monitor 108, and table light 109.

Seat 101 is a place where user 104 sits, and includes backrest 111, seating portion 112, and footrest 113. When backrest 111, seating portion 112, and footrest 113 make a slide movement, seat 101 makes a transition between a seated state (a first state, FIG. 2) in which a minor angle formed between backrest 111 and seating portion 112 is a first angle and a lying state (a second state, FIG. 4) in which the minor angle formed between backrest 111 and seating portion 112 is a second angle greater than the first angle.

Specifically, as illustrated in FIG. 2 to FIG. 4, the upper end portion of backrest 111 vertically slides along wall 102 behind seat 101 (on the left in FIG. 2). Along with this slide, a lower end portion of backrest 111 horizontally slides. That is to say, the lower end portion slides forward (to the right in FIG. 2) along with a downward slide of the upper end portion. In addition, seating portion 112 and footrest 113 also slide forward along with this slide of the lower end portion. Footrest 113 is pivotable about its end portion located closer to the seating portion, and is substantially vertical in the seated state and is substantially horizontal in the lying state. This means that, in the lying state, backrest 111, seating portion 112, and footrest 113 align substantially horizontally. In such a manner as described above, seat 101 makes a transition from the seated state illustrated in FIG. 2 to the lying state illustrated in FIG. 4 via the state illustrated in FIG. 3.

Backrest 111 mainly supports the back of user 104 in the seated state. Seating portion 112 is mainly in contact with the buttocks of user 104 in the seated state, and supports the sitting posture.

Wall 102 is a partition and is disposed in the vicinity of seat 101 to surround seat 101 at least partially. Furthermore, wall 102 supports backrest 111, seating portion 112, and footrest 113 in a slidable manner. It should be noted that although the example described here is a case where backrest 111, seating portion 112, and footrest 113 are supported by wall 102, at least one of backrest 111, seating portion 112, and footrest 113 may be supported by a specialized support member, for example.

Sleep control light 103 is a luminaire for controlling sleep of user 104. Although the type of a light source used for sleep control light 103 is not particularly limited, a light-emitting diode (LED), a fluorescent light, a laser light, or an organic electroluminescent (EL) element may be used, for example. In a sleep promoting mode which is a mode for prompting user 104 to sleep, sleep control light 103 irradiates user 104 with light promoting user 104 to sleep, whereas in an awakening promoting mode which is a mode for prompting user 104 to awake, sleep control light 103 irradiates user 104 with light promoting user 104 to awake.

Optical axis L3 of sleep control light 103 is tilted downward with respect to the horizontal plane. Specifically, optical axis L3 passes through backrest 111 in the lying state. More specifically, optical axis L3 is set so as to pass through a facial region of user 104. Here, the facial region includes the face of the user and a region surrounding the face of the user. In other words, optical axis L3 is set so as to pass through a headrest included in backrest 111. This makes it possible to effectively irradiate the facial region of user 104 with the light promoting sleep or the light promoting awakening in the lying state.

Sleep control light 103 is fixed to wall 102 behind seat 101 and is supported by wall 102. That is to say, sleep control light 103 is fixed and does not move along with the above-described slide movements. It should be noted that although the example described here is a case where sleep control light 103 is fixed to wall 102, sleep control light 103 may be fixed using a specialized support member, for example. For example, sleep control light 103 may be fixed using a support member connected to seat 101.

As illustrated in FIG. 2, sleep control light 103 is located above seat 101 in the seated state. At least a portion of sleep control light 103 is covered by backrest 111 in the seated state, whereas sleep control light 103 is exposed in the lying state. Specifically, as illustrated in FIG. 2, a light emitting surface (a downward-facing surface) of sleep control light 103 is covered by the top surface of backrest 111 in the seated state. In the lying state, the light emitting surface of sleep control light 103 is exposed as backrest 111 makes a slide movement.

Reading light 105 is a luminaire which irradiates the hands of user 104 with light. Although the type of a light source used for reading light 105 is not particularly limited, an LED, a fluorescent light, a laser light, or an organic EL element may be used, for example. Reading light 105 is installed on wall 102 on the lateral side, for example.

Optical axis L1 of reading light 105 passes through seating portion 112 in the seated state, and passes through backrest 111 or seating portion 112 in the lying state. Here, in the lying state, the position at which optical axis L1 of reading light 105 passes through backrest 111 or seating portion 112 is closer to seating portion 112 (more forward) than the position at which optical axis L3 of sleep control light 103 passes through backrest 111 is.

Table 107 is provided in front of seat 101. Monitor 108 is installed on table 107 or wall 106, and displays video. Wall 106 is a partition and is disposed in the vicinity of table 107 and monitor 108 so as to surround table 107 and monitor 108 at least partially.

Table light 109 is a luminaire which irradiates table 107 with light. For example, optical axis L2 of table light 109 passes through table 107. Although the type of a light source used for table light 109 is not particularly limited, an LED, a fluorescent light, a laser light, or an organic EL element may be used, for example. Table light 109 is installed on wall 106 on the lateral side, for example.

It should be noted that the configuration illustrated in FIG. 2 to FIG. 4 is a mere example, and illumination system 100 does not necessarily need to include all the structural elements illustrated in FIG. 2 to FIG. 4. For example, illumination system 100 need not include at least one of the following: wall 102, reading light 105, wall 106, table 107, monitor 108, and table light 109.

As described above, with illumination system 100 according to the present embodiment, the facial region of user 104 is irradiated with light emitted from sleep control light 103 in the lying state as illustrated in FIG. 4. This makes it possible to more effectively support sleep or awakening. Since sleep control light 103 is located above seat 101 in the seated state, sleep control light 103 can be stored without becoming a hindrance in the seated state.

If a luminaire conventionally used for reading or having a meal is used for sleep control, the position at which the luminaire is installed is far from the face of user 104, and an amount of light necessary for awakening, for example, cannot be obtained efficiently due to the long irradiation distance.

In contrast, according to the present embodiment, it is possible to effectively support awakening and sleep as light is emitted from a region in the vicinity of the head of user 104 in the lying state. Furthermore, energy saving is possible because sleep control light 103 only needs to emit a minimum amount of light necessary for supporting awakening or sleep.

[Variations]

Figure 5:
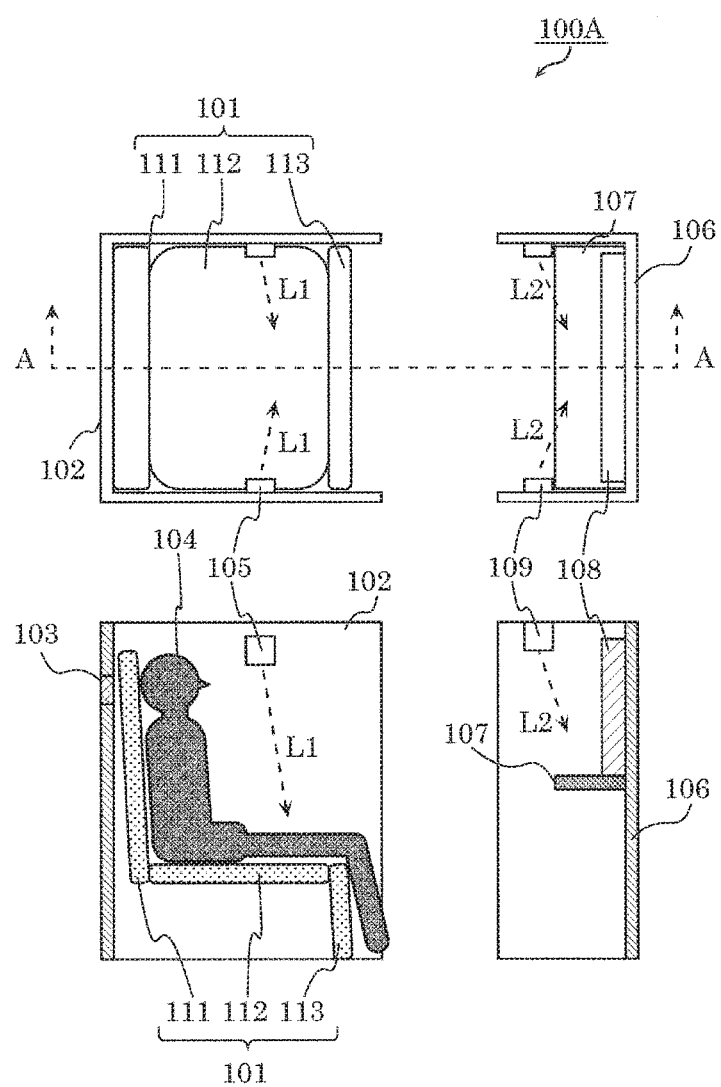
FIG. 5 is a plan view and a cross sectional view illustrating a seated state of an illumination system according to Variation 1 of an embodiment.
Figure 6:
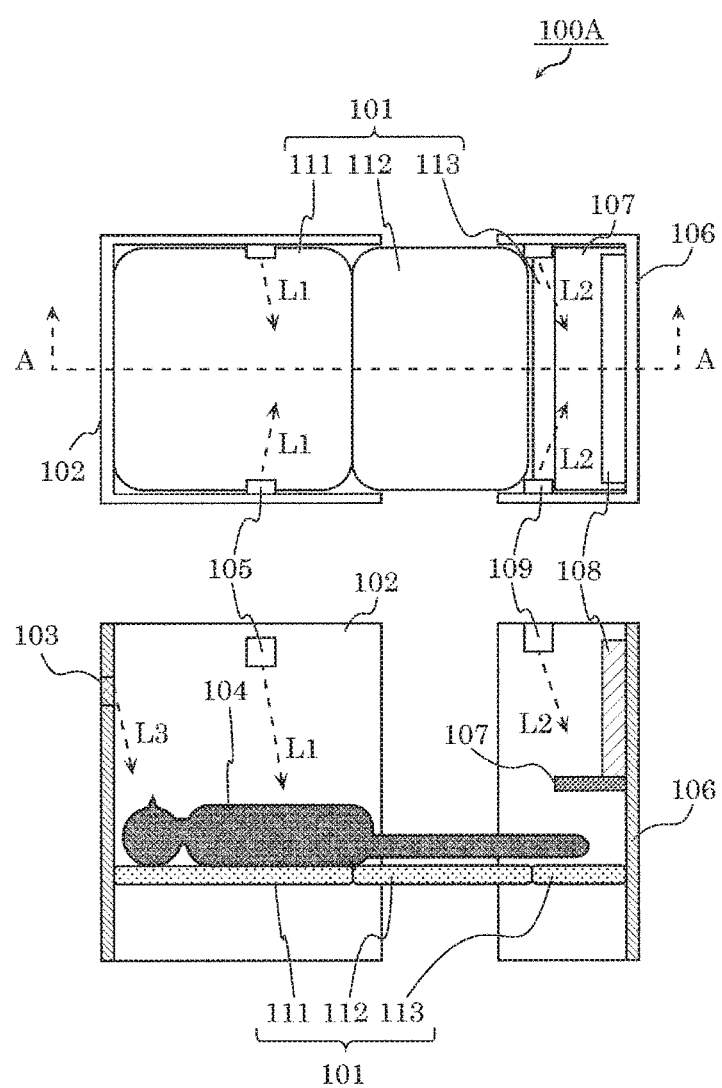
FIG. 6 is a plan view and a cross sectional view illustrating a lying state of an illumination system according to Variation 1 of an embodiment.

FIG. 5 and FIG. 6 illustrate a configuration of illumination system 100A according to Variation 1 of illumination system 100. FIG. 5 and FIG. 6 illustrate a configuration of illumination system 100A in the seated state and the lying state, respectively. Illumination system 100A illustrated in FIG. 5 and FIG. 6 is different from illumination system 100 illustrated in FIG. 2 to FIG. 4 in terms of the position of sleep control light 103.

Specifically, sleep control light 103 is located behind seat 101 in the seated state. More specifically, sleep control light 103 is installed on wall 102 behind backrest 111 in the seated state.

The same advantageous effect as that described above can be achieved even in this configuration.

Figure 7:
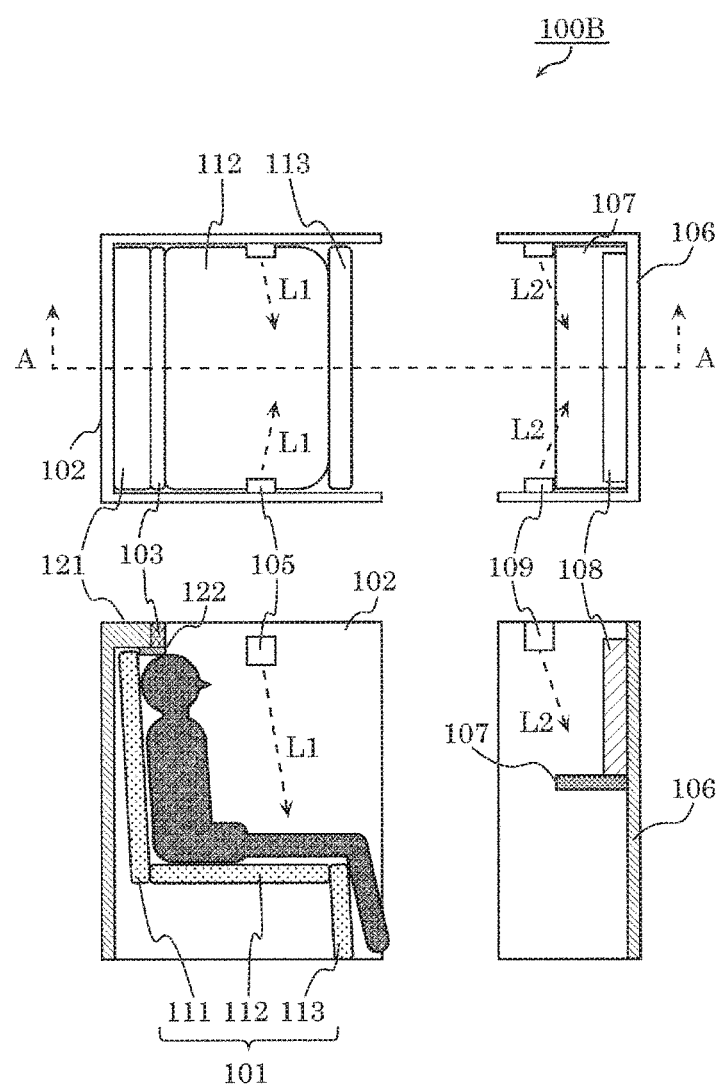
FIG. 7 is a plan view and a cross sectional view illustrating a seated state of an illumination system according to Variation 2 of an embodiment.
Figure 8:
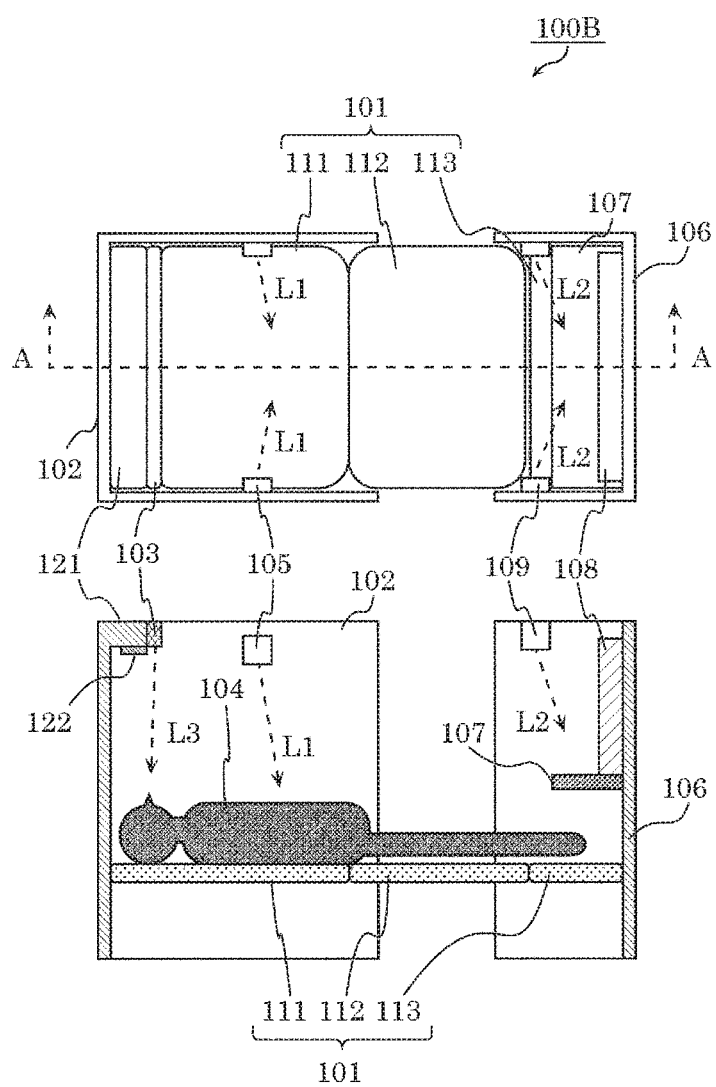
FIG. 8 is a plan view and a cross sectional view illustrating a lying state of an illumination system according to Variation 2 of an embodiment.

FIG. 7 and FIG. 8 illustrate a configuration of illumination system 100B according to Variation 2 of illumination system 100. FIG. 7 and FIG. 8 illustrate a configuration of illumination system 100B in the seated state and the lying state, respectively.

Illumination system 100B illustrated in FIG. 7 and FIG. 8 is different from illumination system 100 illustrated in FIG. 2 to FIG. 4 in that wall 102 is provided with protrusion 121 and sleep control light 103 is disposed on protrusion 121.

Protrusion 121 protrudes from wall 102 toward a region above backrest 111 in the seated state. Specifically, protrusion 121 is provided at the upper portion of wall 102 behind backrest 111. Protrusion 121 protrudes toward the front of backrest 111. Sleep control light 103 is disposed at the tip (the front end portion) of protrusion 121.

Illumination system 100B includes lid 122. With lid 122, at least a portion of sleep control light 103 is covered in the seated state, whereas sleep control light 103 is exposed in the lying state. Specifically, lid 122 covers the light emitting surface of sleep control light 103 in the seated state. Furthermore, lid 122 is configured to make a slide movement along with the slide of backrest 111. With this, the light emitting surface of sleep control light 103 is exposed in the lying state as illustrated in FIG. 8.

The same advantageous effect as that described above can be achieved even in this configuration.

Figure 9:
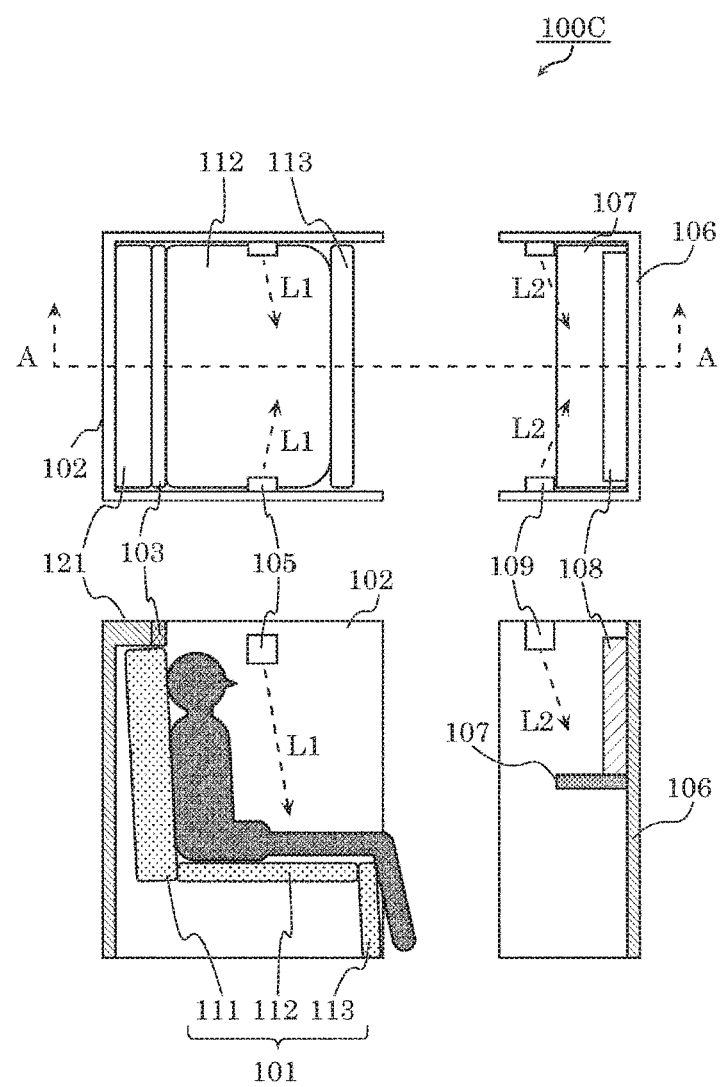
FIG. 9 is a plan view and a cross sectional view illustrating a seated state of an illumination system according to another example of Variation 2 of an embodiment.

It should be noted that like illumination system 100C illustrated in FIG. 9, sleep control light 103 may be covered by backrest 111 in the seated state by making backrest 111 thicker.

Figure 10:
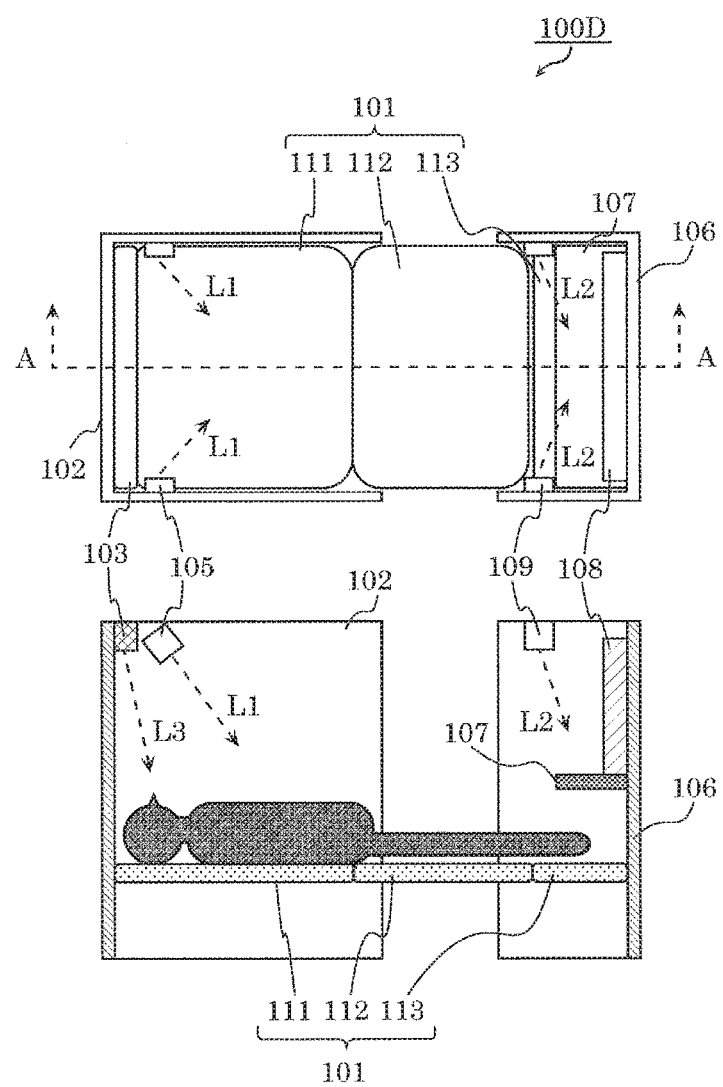
FIG. 10 is a plan view and a cross sectional view illustrating a lying state of an illumination system according to a variation of an embodiment.

The position of reading light 105 is not limited to the example illustrated in FIG. 2 to FIG. 4. For example, like illumination system 100D illustrated in FIG. 10, reading light 105 may be disposed in the vicinity of sleep control light 103. Furthermore, in the case of using protrusion 121 as illustrated in FIG. 7 and FIG. 8, reading light 105 may be disposed at protrusion 121.

[Sleep Support Operation]

Hereinafter, a sleep support operation using above illumination system 100 will be described.

Figure 11:
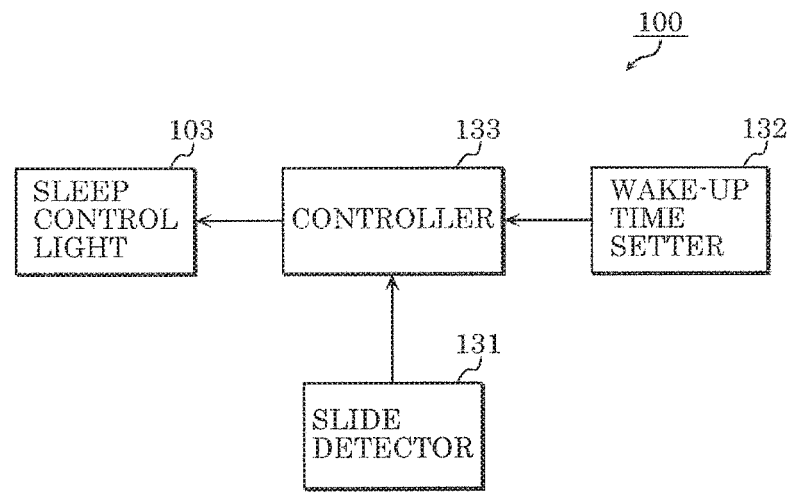
FIG. 11 is a functional block diagram of an illumination system according to an embodiment.

FIG. 11 is a block diagram illustrating a functional configuration of illumination system 100. As illustrated in FIG. 11, illumination system 100 further includes slide detector 131, wake-up time setter 132, and controller 133. These processing members may be configured in the form of a specialized hardware product, may be realized by a processor, such as a CPU, executing a program stored in, for example, a memory, or may be realized by a combination of these.

Slide detector 131 detects a slide movement of backrest 111. That is to say, slide detector 131 detects whether seat 101 is in the seated state or the lying state. For example, slide detector 131 may mechanically detect that backrest 111 has actually made a slide movement or mechanically detect an angle of backrest 111, or detect an operation (an operation on a button, a switch, or a touch panel, for example) performed by user 104 for causing backrest 111 to make a slide movement.

Wake-up time setter 132 sets an estimated wake-up time at which user 104 is to wake up. For instance, the wake-up time is set through an operation performed by user 104 on a button, a switch, or a touch panel, for example. It should be noted that the wake-up time may be a predetermined time or a time automatically set based on an estimated time for arrival at a destination of the mobile body. Furthermore, instead of the wake-up time, a sleep period from a start time of the sleep promoting mode, which is to be described later, or the current time to the wake-up time may be set.

Controller 133 executes the sleep promoting mode and the awakening promoting mode by controlling sleep control light 103 based on a detection result of slide detector 131 and the wake-up time.

Figure 12:
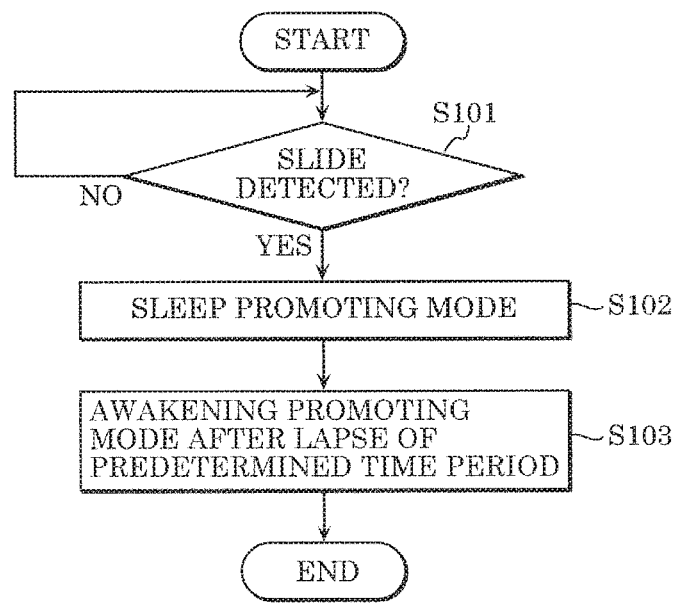
FIG. 12 is a flowchart of a functional support operation performed by an illumination system according to an embodiment.
Figure 13:
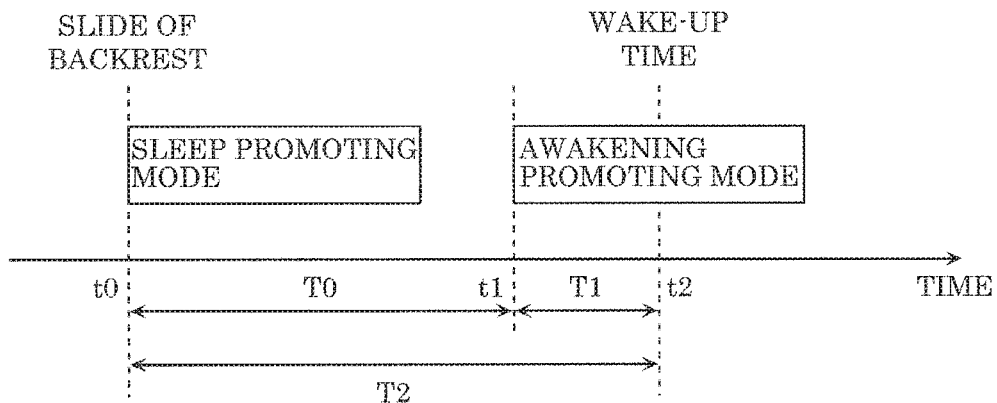
FIG. 13 illustrates an example of a functional support operation performed by an illumination system according to an embodiment.

Hereinafter, a flow of the sleep support operation will be described. FIG. 12 is a flowchart of the sleep support operation. FIG. 13 illustrates an example of the sleep support operation.

When slide detector 131 detects a slide movement of backrest 111, that is, a transition from the seated state to the lying state (YES in S101, time t0 in FIG. 13), controller 133 starts the sleep promoting mode (S102). The sleep promoting mode is a mode for promoting user 104 to sleep. For example, in the sleep promoting mode, controller 133 performs control so as to gradually reduce the brightness of sleep control light 103.

Next, controller 133 starts the awakening promoting mode at time t1 after a lapse of predetermined time period T0 (a first time period) from time t0 (S103). Here, time t1 is a time earlier than preset wake-up time t2 by time period T1. That is to say, controller 133 starts the awakening promoting mode at a time earlier than preset wake-up time t2 by time period T1 (a second time period).

The awakening promoting mode is a mode for promoting user 104 to awake (wake up). For example, in the awakening promoting mode, controller 133 performs control so as to gradually increase the brightness of sleep control light 103.

The color temperature of sleep control light 103 in the sleep promoting mode is set lower than the color temperature in the awakening promoting mode. For example, the color temperature of sleep control light 103 in the awakening promoting mode is set higher than 3000 K. As an example, the color temperature in the awakening promoting mode is 5000 K, whereas the color temperature in the sleep promoting mode is 3000 K.

At wake-up time t2, user 104 may be notified that it is the wake-up time, using a sound or vibrations, for example.

As described above, since a transition to the sleep promoting mode or the awakening promoting mode automatically occurs when user 104 makes a slide movement, it is possible to enhance the convenience for user 104. Furthermore, by starting the awakening promoting mode before wake-up time t2, the degree of awakening of user 104 can be gradually increased before wake-up time t2, and thus user 104 can wake up feeling refreshed.

Figure 14:
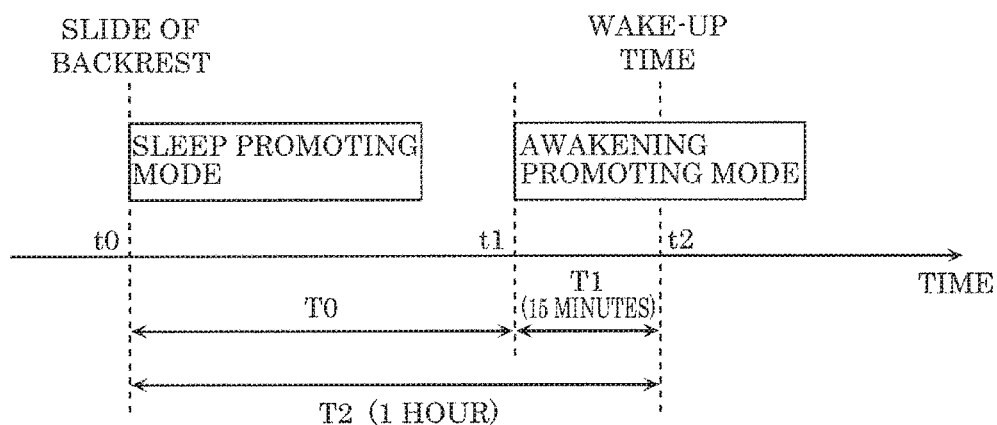
FIG. 14 illustrates an example of a functional support operation performed by an illumination system according to an embodiment.
Figure 15:
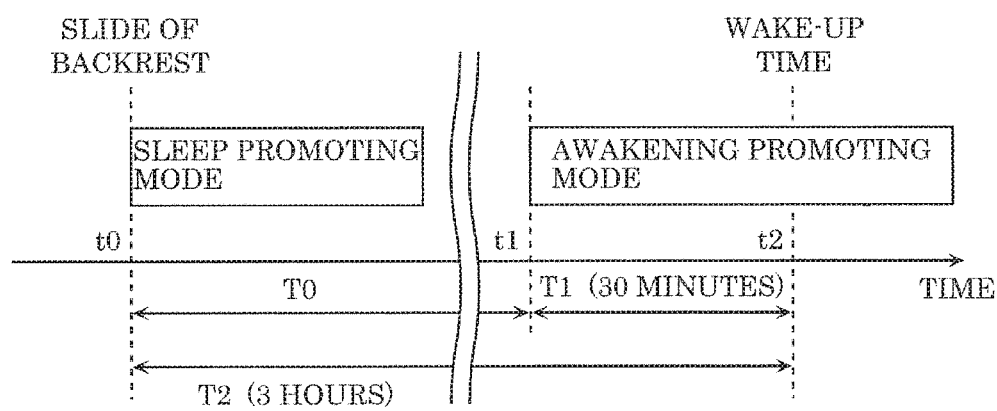
FIG. 15 illustrates an example of a functional support operation performed by an illumination system according to an embodiment.

In addition, controller 133 may change start time t1 of awakening promoting mode, that is, time period T1, according to sleep period T2 (wake-up time t2) which has been set. Specifically, controller 133 increases time period T1 (a second time period) with increase in sleep period T2 (a third time period). For example, as illustrated in FIG. 14, controller 133 sets 15 minutes as time period T1 when 1 hour is set as sleep period T2. Also, as illustrated in FIG. 15, controller 133 sets 30 minutes as time period T1 when 3 hours is set as sleep period T2. It should be noted that this change in time period T1 according to sleep period T2 may be performed in a stepwise manner or a continuous manner.

Since this makes it possible to change, according to the depth of sleep of user 104, the time at which the awakening promoting mode starts, it is possible to more effectively promote user 104 to awake. Furthermore, when sleep period T2 is short, it is possible to reduce the occurrence of the awakening promoting mode starting immediately after the sleep promoting mode ends.

It should be noted that the trigger for starting the sleep promoting mode is not limited to the slide movement of seat 101 only, and may be based on an operation by user 104 or a preset time, for example.

Moreover, although the above description presented the example where sleep control light 103 is covered in the seated state, sleep control light 103 need not be covered. In addition, sleep control light 103 may be turned on in the seated state. In this case, sleep control light 103 in the seated state functions as a luminaire for design. That is to say, sleep control light 103 may be turned on before the sleep promoting mode starts, turned off (or dimmed to a predetermined brightness) in the sleep promoting mode, turned on in the awakening promoting mode, and may continue to be on even after the awakening promoting mode ends.

[Experimental Results]

Figure 16:
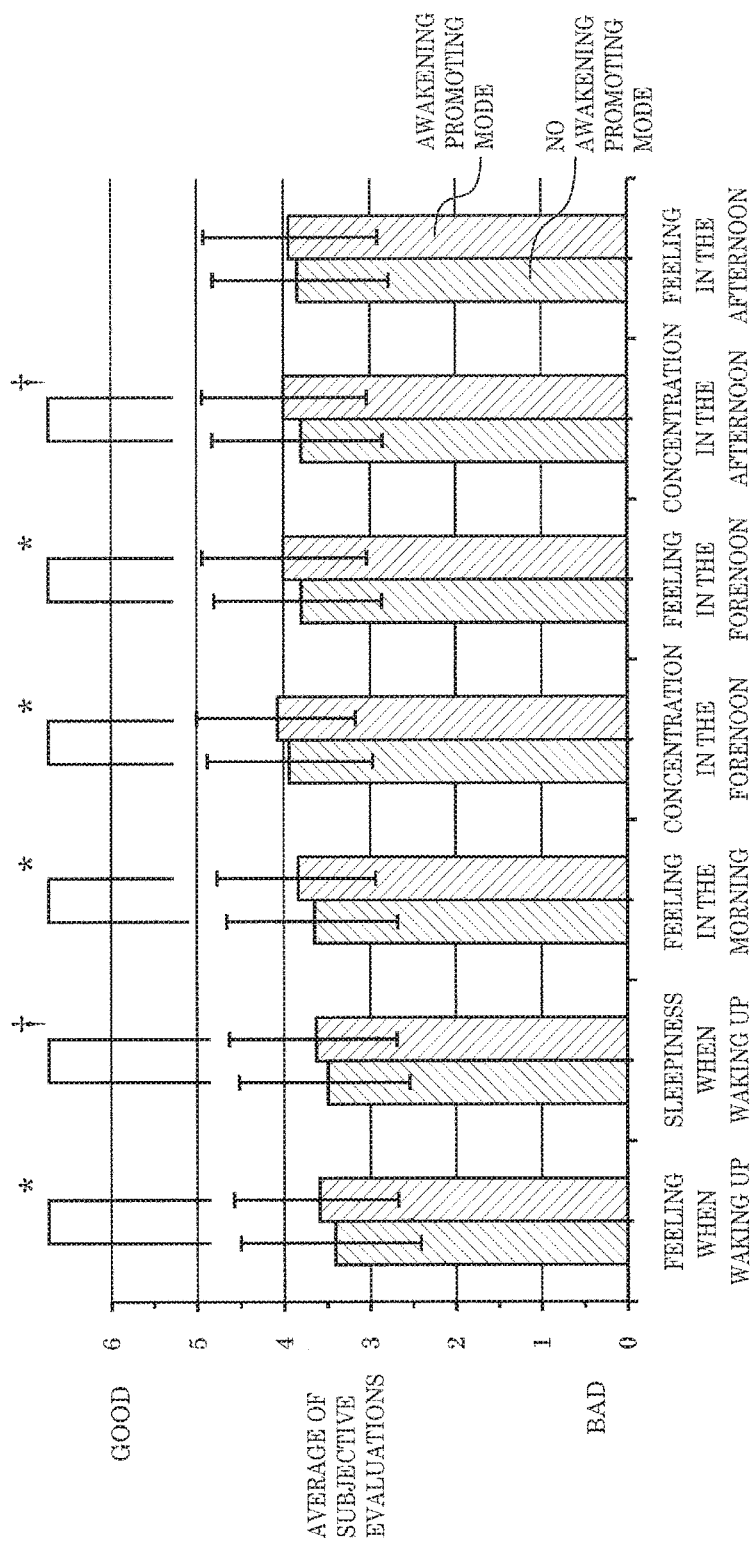
FIG. 16 illustrates a result of an experiment using an awakening promoting mode of an illumination system according to an embodiment.

The following experiment was conducted in order for a user to wake up pleasantly. With 58 males and females serving as test subjects for the experiment, each subject took sleep for a usual time period at the subject's home using an illumination system having the awakening promoting mode, and was then woken up by the awakening promoting mode. FIG. 16 illustrates results of subjective evaluation after waking up. It is shown that in the case of waking up using the illumination system having the awakening promoting mode, the values of the feeling and sleepiness when waking up are significantly high.

Figure 17:
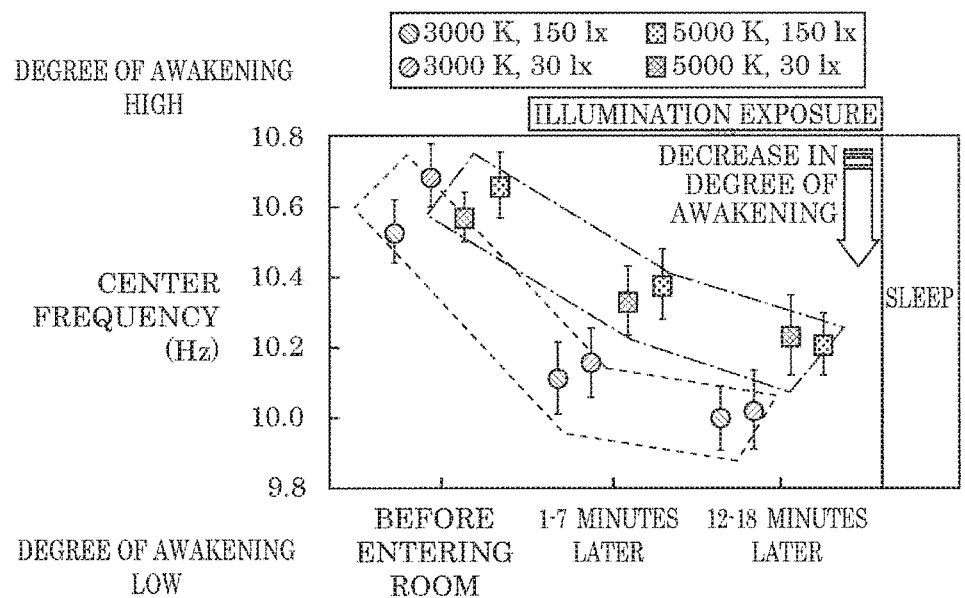
FIG. 17 illustrates an experimental result on the degree of awakening with respect to color temperatures, according to an embodiment.

FIG. 17 illustrates results of a physiological evaluation experiment conducted on eight people as subjects using, as parameters, the color temperature and the illuminance before going to sleep. The experiment showed that the color temperature affects the degree of awakening more significantly than the illuminance does. A comparison between a decrease in the degree of awakening brought about by the color temperature of 3000 K and a decrease in the degree of awakening brought about by the color temperature of 5000 K showed that the decrease in the degree of awakening brought about by the color temperature of 3000 K tends to be larger. From this result, it is considered more effective to set a lower color temperature for the sleep promoting mode than for the awakening promoting mode. Furthermore, for the awakening promoting mode, it is considered desirable to set a color temperature of at least 3000 K, and more preferably at least 4000 K.

[Configuration of Sleep Control Light]

As described earlier, sleep control light 103 has a function to emit light having different color temperatures between the sleep promoting mode and the awakening promoting mode. Hereinafter, examples of the configuration of sleep control light 103 that performs this function will be described.

Figure 18:
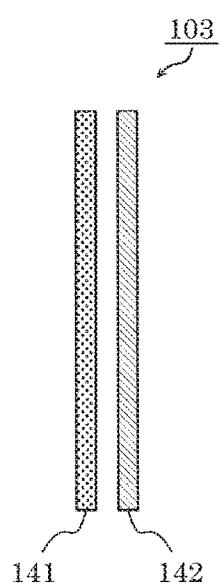
FIG. 18 illustrates an example of a configuration of a sleep control light according to an embodiment.

FIG. 18 to FIG. 21 illustrate different examples of the configuration of sleep control light 103. As illustrated in FIG. 18, sleep control light 103 includes fluorescent lights 141 and 142 having mutually different light colors. Light having different color temperatures can be emitted through mixture of the colors of light from fluorescent lights 141 and 142.

Figure 19:
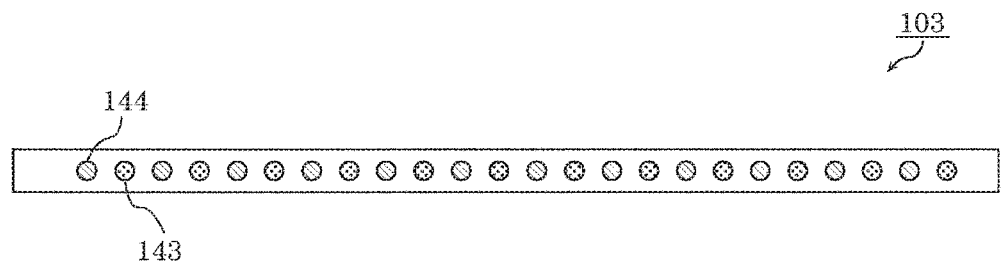
FIG. 19 illustrates an example of a configuration of a sleep control light according to an embodiment.
Figure 20:
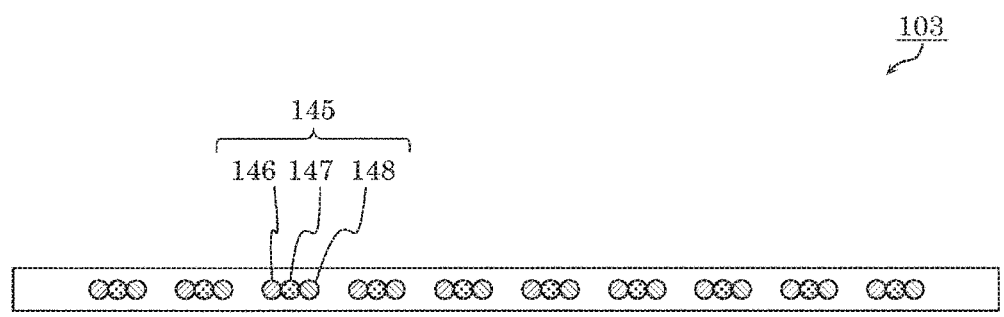
FIG. 20 illustrates an example of a configuration of a sleep control light according to an embodiment.
Figure 21:
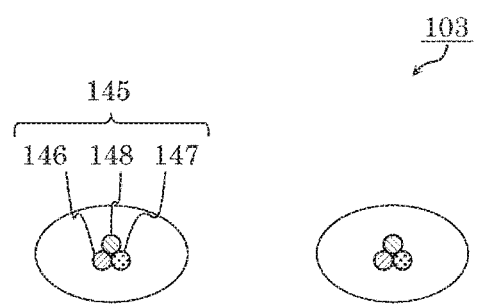
FIG. 21 illustrates an example of a configuration of a sleep control light according to an embodiment.

Moreover, as illustrated in FIG. 19, sleep control light 103 may include LED chips 143 and 144 having mutually different light colors. Alternatively, as illustrated in FIG. 20, sleep control light 103 may include a plurality of light sources 145 each including LED chips 146, 147, and 148 of RGB. Light having different color temperatures can be emitted through mixture of the colors of light from these LED chips. Alternatively, it is also possible to emit light having different color temperatures using LED chips of RGB and white, that is, with addition of white. Light sources 145 may be disposed linearly, or may be point light sources as illustrated in FIG. 21.

While the foregoing has described the illumination system according to an embodiment of the present disclosure, the present disclosure is not to be limited to this embodiment.

For example, the present disclosure may be realized as a mobile body (such as an airplane or a train) including the above illumination system.

Furthermore, although the foregoing has described the configuration in which seat 101 makes a transition between the seated state and the lying state when backrest 111 and seating portion 112 make a slide movement, the present disclosure is also applicable to a configuration in which seat 101 makes a transition between the seated state and the lying state when backrest 111 pivots about its lower end portion rather than when backrest 111 makes a slide movement.

Moreover, part or all of the processing members included in the illumination system according to the above embodiment may be realized as an LSI which is an integrated circuit. These may be implemented in a single chip individually, or in a single chip that includes part or all of them.

Moreover, the method of circuit integration is not limited to LSI. Integration may be realized with a specialized circuit or a general purpose processor. It is also possible to use: a field programmable gate array (FPGA) that is programmable after the LSI has been manufactured; and a reconfigurable processor that allows reconfiguration of the connections and settings of the inner circuit cells of the LSI circuit.

That is to say, each of the structural elements in the above embodiment may be configured in the form of a specialized hardware product, or may be realized by executing a software program suitable for the structural element. Each of the structural elements may be realized by means of a program executing unit, such as a CPU or a processor, reading and executing the software program recorded on a recording medium such as a hard disk or a semiconductor memory.

Moreover, the block diagram illustrates one example of the division of functional blocks; a plurality of functional blocks may be realized as a single functional block, a single functional block may be broken up into a plurality of functional blocks, and part of one function may be transferred to another functional block. In addition, functions of a plurality of functional blocks having similar functions may be processed in parallel or by time-division by a single hardware or software product.

While the foregoing has described one or more embodiments and/or other examples of an illumination system, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An illumination system, comprising:
   a seat;
   a wall surrounding the seat at least partially; and
   a sleep control light for controlling sleep, wherein
   the seat includes a backrest and a seating portion, and makes a transition between a first state and a second state when the backrest and the seating portion make a slide movement, the first state being a state in which a minor angle formed between the backrest and the seating portion is a first angle, the second state being a state in which the minor angle formed between the backrest and the seating portion is a second angle greater than the first angle,
   an optical axis of the sleep control light is tilted downward with respect to a horizontal plane,
   the sleep control light is located either one of behind the seat and above the seat when the seat is in the first state, and
   the optical axis of the sleep control light passes through the backrest when the seat is in the second state.

2. The illumination system according to claim 1, wherein
   at least a portion of the sleep control light is covered by the backrest when the seat is in the first state, and
   the sleep control light is exposed when the seat is in the second state.

3. The illumination system according to claim 1, wherein the sleep control light is supported by the wall.

4. The illumination system according to claim 3, wherein:
   the wall includes a protrusion protruding from the wall toward a region above the backrest when the seat is in the first state,
   the sleep control light is disposed at the protrusion,
   at least a portion of the sleep control light is covered by the backrest when the seat is in the first state, and
   the sleep control light is exposed when the seat is in the second state.

5. The illumination system according to claim 3, wherein:
   the wall includes a protrusion protruding from the wall toward a region above the backrest when the seat is in the first state,
   the sleep control light is disposed at the protrusion,
   the illumination system further comprises a lid which covers at least a portion of the sleep control light when the seat is in the first state, and
   the sleep control light is exposed when the seat is in the second state.

6. The illumination system according to claim 1, wherein the optical axis of the sleep control light passes through a facial region of a user when the seat is in the second state, the facial region including a face of the user and a region surrounding the face of the user.

7. The illumination system according to claim 1, further comprising
   a controller which executes a sleep promoting mode for promoting sleep and an awakening promoting mode for promoting awakening, by controlling the sleep control light.

8. The illumination system according to claim 7, wherein the controller starts the sleep promoting mode when the seat makes a transition from the first state to the second state, and starts the awakening promoting mode after a lapse of a first time period following a start of the sleep promoting mode.

9. The illumination system according to claim 8, wherein the controller starts the awakening promoting mode at a time earlier than a wake-up time by a second time period, the wake-up time being a preset time.

10. The illumination system according to claim 9, wherein the controller increases the second time period with increase in a third time period which is a time period from the start of the sleep promoting mode to the wake-up time.

11. The illumination system according to claim 7, wherein a color temperature of the sleep control light in the sleep promoting mode is lower than a color temperature of the sleep control light in the awakening promoting mode.

12. The illumination system according to claim 7, wherein a color temperature of the sleep control light in the awakening promoting mode is greater than 3000 K.

13. The illumination system according to claim 1, further comprising
   a reading light, wherein
   when the seat is in the second state, a position at which an optical axis of the reading light passes through either one of the backrest and the seating portion is closer to the seating portion than a position at which the optical axis of the sleep control light passes through the backrest.

14. A mobile body comprising
   the illumination system according to claim 1.

* * * * *